United States Patent
Shih

(10) Patent No.: US 7,379,311 B2
(45) Date of Patent: May 27, 2008

(54) INRUSH CURRENT CONTROL CIRCUIT

(75) Inventor: Chih-Chung Shih, Taipei (TW)

(73) Assignee: Mitac International Corp., Taoyuan (TW)

( * ) Notice: Subject to any disclaimer, the term of this patent is extended or adjusted under 35 U.S.C. 154(b) by 166 days.

(21) Appl. No.: 11/485,425

(22) Filed: Jul. 13, 2006

(65) Prior Publication Data

US 2007/0014134 A1 Jan. 18, 2007

(30) Foreign Application Priority Data

Jul. 13, 2005 (TW) .............................. 94123800 A

(51) Int. Cl.
*H02H 7/125* (2006.01)
*H02M 5/42* (2006.01)
*G05F 1/613* (2006.01)

(52) U.S. Cl. .................... 363/52; 363/89; 323/225; 323/908

(58) Field of Classification Search ................. 363/50, 363/52, 53, 84, 89, 125, 127; 323/223, 225, 323/268, 271, 908; 361/18, 79, 93.9
See application file for complete search history.

(56) References Cited

U.S. PATENT DOCUMENTS 5,420,780 A * 5/1995 Bernstein et al. ............ 363/89
5,920,186 A * 7/1999 Ninh et al. .................. 323/303
7,068,016 B2 * 6/2006 Athari ......................... 323/222
7,164,591 B2 * 1/2007 Soldano ....................... 363/89
2006/0274468 A1 * 12/2006 Phadke ....................... 361/93.1

* cited by examiner

*Primary Examiner*—Matthew V Nguyen
(74) *Attorney, Agent, or Firm*—Harness, Dickey & Pierce, P.L.C.

(57) ABSTRACT

An inrush current control circuit includes a first and second control units connected in series, wherein the first and second control units all have a current limiting resistor and switch connected in parallel. The current limiting resistor of the first control unit is used to prevent an inrush current generated at the moment an alternative current is supplied. The switch of the first control unit turns on based on the voltage of the capacitor, and current bypasses the first current limiting resistor. The current limiting resistor of the second control unit is used to prevent an inrush current generated at the moment an alternative current shifts from a high voltage level to a low voltage level or from a low voltage level to a high voltage level. The switch of the second control unit turns on based on the alternative current and current bypasses the second current limiting resistor.

21 Claims, 10 Drawing Sheets

INRUSH CURRENT CONTROL CIRCUIT

CROSS-REFERENCE TO RELATED APPLICATIONS

This non-provisional application claims priority under 35 U.S.C. § 119(a) on Patent Application No(s). 094123800 filed in Taiwan, R.O.C. on Jul. 13, 2005, the entire contents of which are hereby incorporated by reference.

BACKGROUND OF THE INVENTION

1. Field of Invention

The present invention relates a power supply control circuit, and more particularly to an inrush current control circuit.

2. Related Art

Inrush current is a common problem with power supply circuits. It usually occurs at the moment a power supply is turned on, producing an immediate surge current, which may produce signal noise, damage power devices and connected equipment. To prevent inrush current, several circuit structures have been developed.

Conventionally, a current limiting resistor is used in inrush current control circuit to connect with the input circuit in series to limit the inrush current within a specified value. However, the series resistor requires a high resistance, which may lead to the waste of power and the generation of unnecessary heat when the system is in normal operation.

Referring to FIG. 1, a conventional inrush current control circuit includes a rectifying circuit BR, a capacitor C, and the main body of the system, wherein a negative temperature coefficient (NTC) thermistor RT is placed on a side of the alternating current (AC) power to control any possible inrush current. The idea is to make use of the characteristic of the NTC thermistor RT that the resistance value of the NTC thermistor is higher at low temperatures and lower at high temperatures. At the moment an electronic device is turned on or an alternative current (AC) power is supplied, the NTC thermistor is at low a temperature and thus has a high resistance, limiting the inrush current of the AC power. As the temperature of NTC thermistor goes up, its resistance begins to drop, and thus the whole system enters to the normal operation condition. However, this type of circuit structure still has problems such as high power consumption and being ineffective under warm boot.

FIG. 2 illustrates another type of conventional inrush current control circuit, in which a current limiting resistor R and a switch SW are placed at a side of the alternative current to limit the inrush current. When the power is supplied, the current limiting resistor R starts to limit current and the capacitor has not been charged yet. The current value at this time is high and may therefore cause damages to other elements. Then, after the capacitor C has been fully charged, the current value begins to drop. However, the current is still relatively high. As a result, the current limiting resistor R continues releasing large amount of heat. Finally, the switch SW, such as a relay, is turned on, and thus the current bypasses the current limiting resistor R to thereby prevent the efficiency of the whole system from being decreased due to the heat released from the current limiting resistor R. However, if the relay is constantly in an "on" state, it is likely to be damaged.

FIG. 3 illustrates still another type of conventional inrush current control circuit, wherein two switches SW1 and SW2 are used to control potential inrush current. The switches SW1 and SW2 are placed at the positive poles of the rectifying circuit BR and the capacitor C, and are controlled by voltage signals from the high voltage terminal of the system. In addition, the elements used in this type of circuit must be able to resist high voltage; therefore, the control circuit has complicated circuit and high cost for elements problems.

Moreover, there has another inrush current control circuit using a timing switch to control inrush current. When an AC power is supplied, a current limiting resistor provides the function to limit current. After the power becomes stable, the current will bypass the current limiting resistor. When the AC power is cut off, the timing switch will also turn off. Specifically, the voltage of the internal direct current (DC) supply rail will decrease; thereby the timing switch will turn off. This type of inrush current control circuit also has the same problems as the inrush current control circuits using NTC thermistors, that is, the timing switch needs a certain period of time to return to the "off" state. Thus, the timing switch should not be connected immediately after the AC power is cut off; otherwise if the current limiting resistor is bypassed, limiting the inrush current may not be realized.

As described above, there is more room for improving the design of inrush current control circuits.

SUMMARY OF THE INVENTION

According to the foreseen problems, an object of the present invention is to provide an inrush current control circuit to solve the problem described above.

To achieve the object, an inrush current control circuit according to the present invention includes a rectifying unit, a power factor correction circuit, a capacitor, a first control unit, and a second control unit.

Wherein, the rectifying unit and the power factor correction circuit are connected to form the main circuit of the inrush current control circuit. The capacitor is placed in the main system and connected to the power factor correction circuit. The first control unit is placed between the rectifying unit and the power factor correction circuit, and the second control unit and the first control unit are connected in series. That is, the second control unit may be connected in series at any place of the inrush current circuit, e.g., the second control unit may be placed between the first control unit and the power factor correction circuit, between the power factor correction circuit and the negative pole of the rectifying unit, at one side of an AC power, or between the first control unit and the positive pole of the rectifying unit.

The first control unit includes a first current limiting resistor and a first switch, and the second control unit includes a second current limiting resistor and a second switch. The first and the second switches are connected to the first and the second current limiting resistors in parallel respectively. The first switch turns on or off based on the DC power voltage and the voltage of the capacitor, while the second switch turns on or off based on the AC power.

The first current limiting resistor is used to prevent a suddenly-generated inrush current generated at the moment the alternative current (AC) power is supplied. The first switch turns on based on the voltage of the capacitor, and thus the current bypasses the first current limiting resistor. The second current limiting resistor is used to a suddenly-generated inrush current when the alternative current shifts between high voltage level and low voltage level, and the second switch turns on based on the alternative current, and thus the current bypasses the second current resistor.

Wherein, when the voltage of the capacitor is stable, the first switch turns on, and when the alternative current is cut off, the first switch turns off. Further, the second switch turns on or off with a specified time delay after the alternative current shifts between a high voltage level and a low voltage level. In other words, the second switch turns on with a specified time delay after the alternative current is supplied; the second switch turns off with a specified time delay after the alternative current shifts from a high voltage level to a low voltage level; the second switch turns on with a specified time delay after the alternative current shifts from a low voltage level to a high voltage level; and the second switch turns off with a specified time delay after the alternative current is cut off, wherein the specified time delay is determined according to the design of the whole system.

The inrush current control circuit according to the present invention further includes a detecting circuit for detecting alternative current connected between the input of the alternative current and the second control unit, to thereby switch on or off the second switch based on the alternative current.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION

Figure 1:
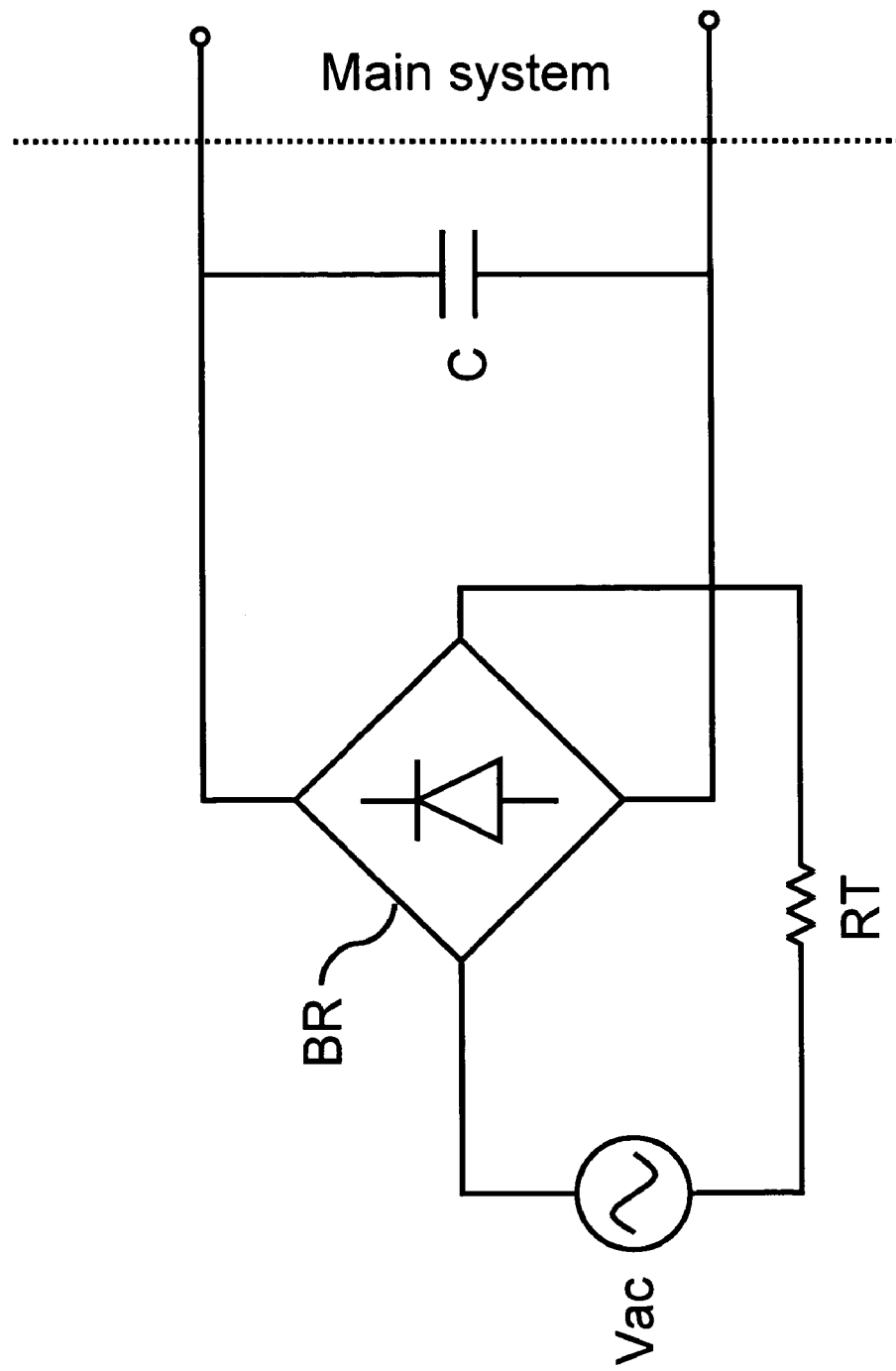
FIG. 1 illustrates a conventional inrush current control circuit.
Figure 2:
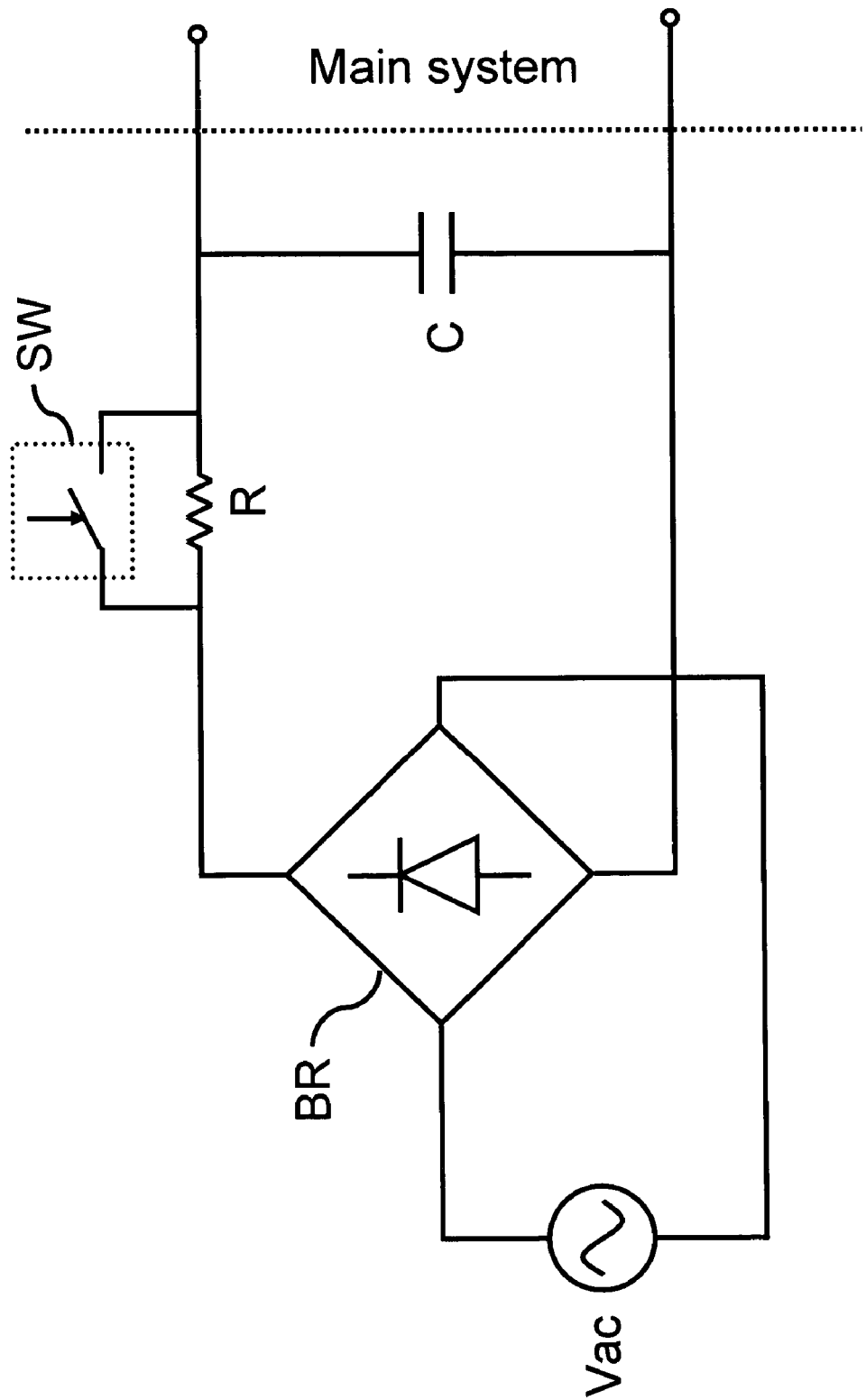
FIG. 2 illustrates another conventional inrush current control circuit.
Figure 3:
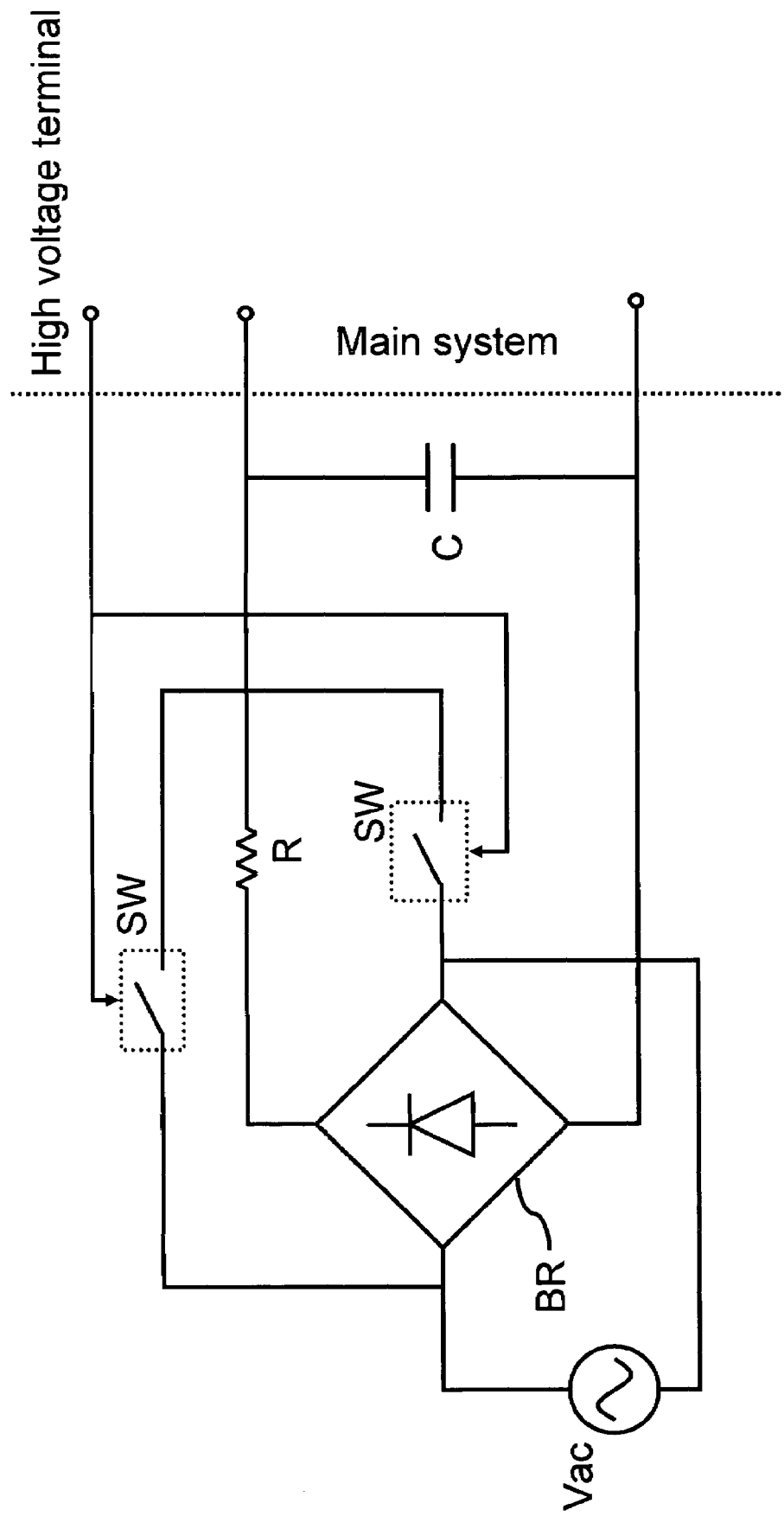
FIG. 3 illustrates still another conventional inrush current control circuit.
Figure 4:
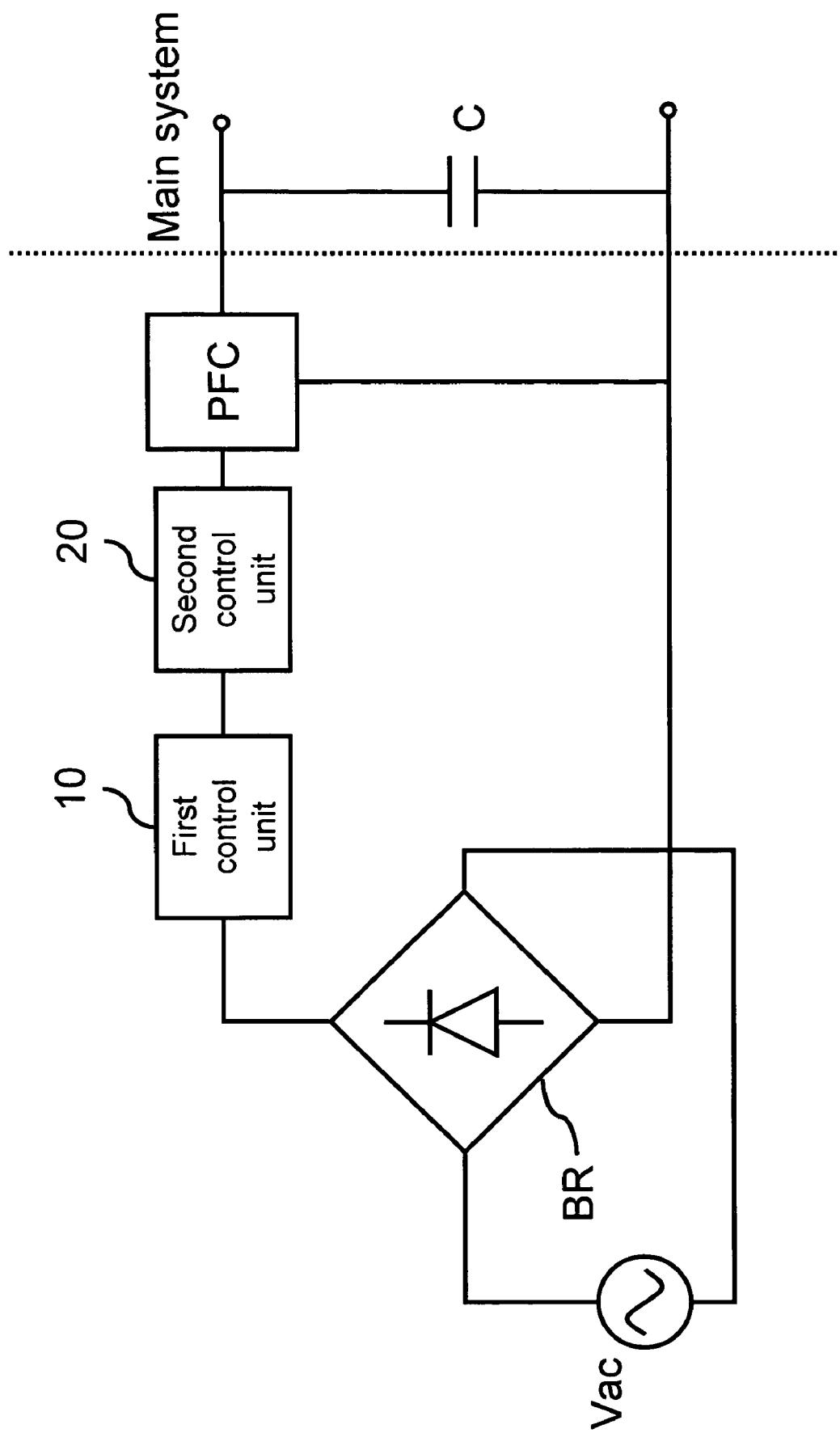
FIG. 4 illustrates an inrush current control circuit according to the first embodiment of the present invention.

Referring to FIG. 4, an inrush current control circuit according to the first embodiment of the present invention includes a rectifying unit BR, a first control unit 10, a second control unit 20, a power factor correction circuit (PFC), and a capacitor C.

Figure 5:
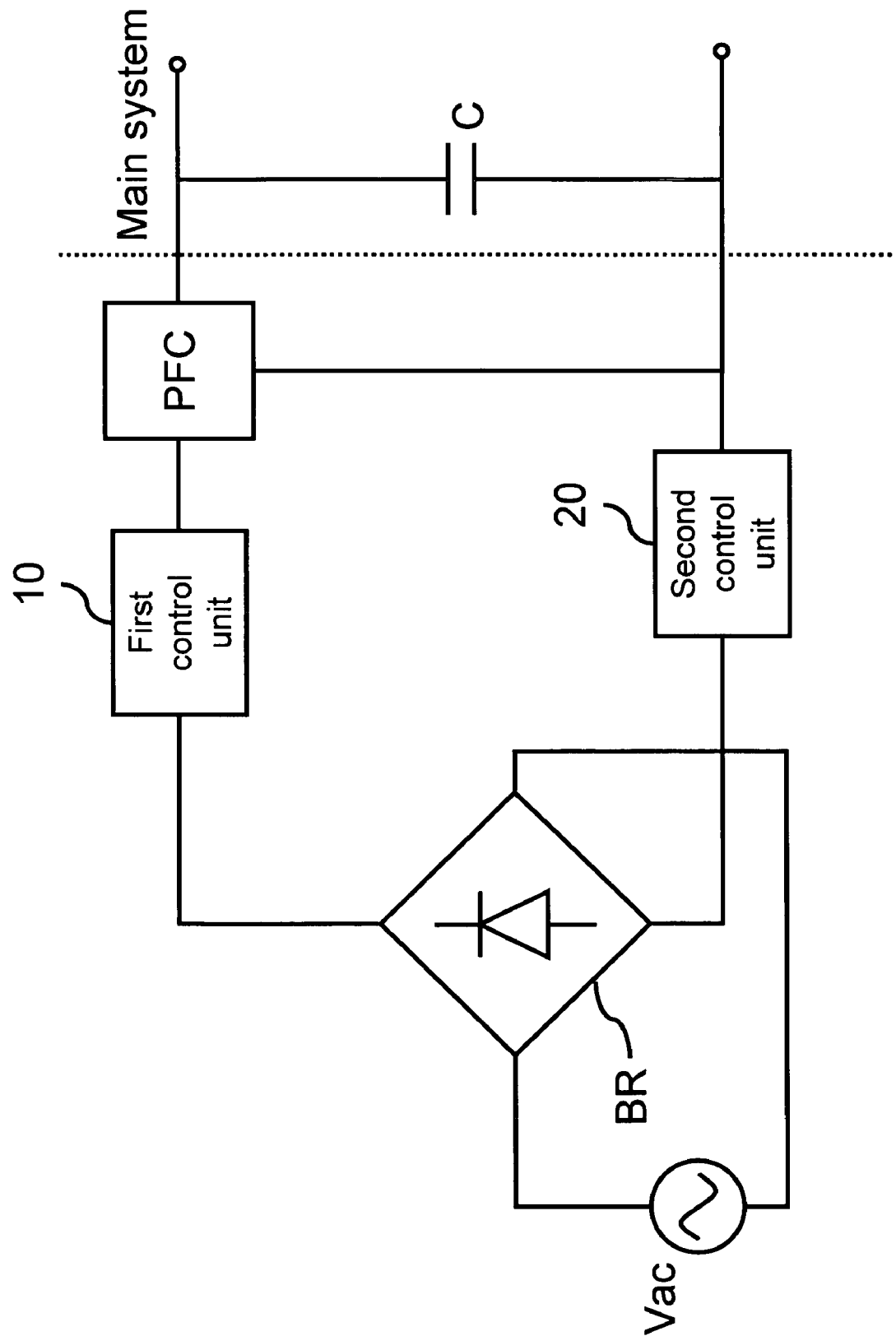
FIG. 5 illustrates an inrush current control circuit according to the second embodiment of the present invention.
Figure 6:
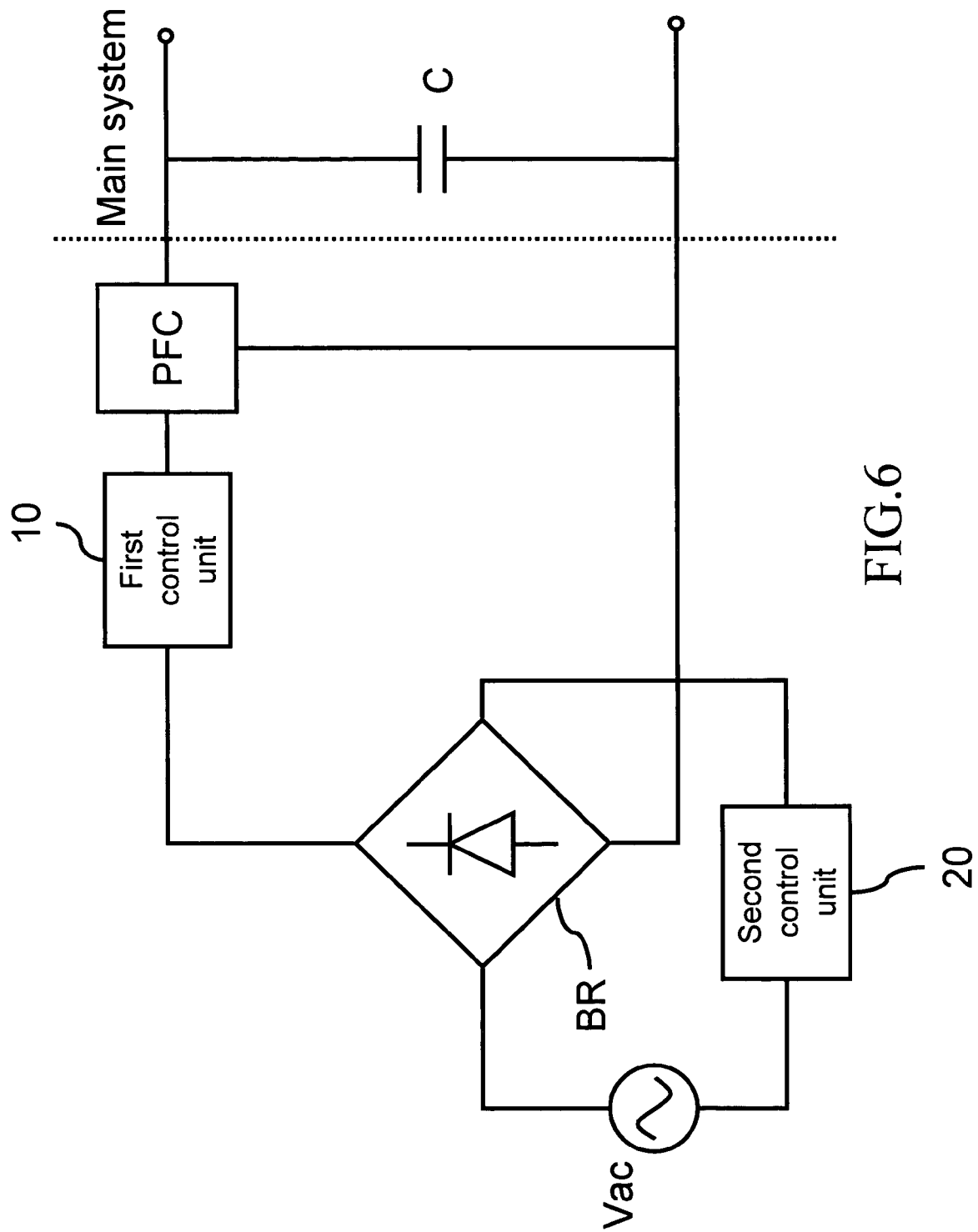
FIG. 6 illustrates an inrush current control circuit according to the third embodiment of the present invention.
Figure 7:
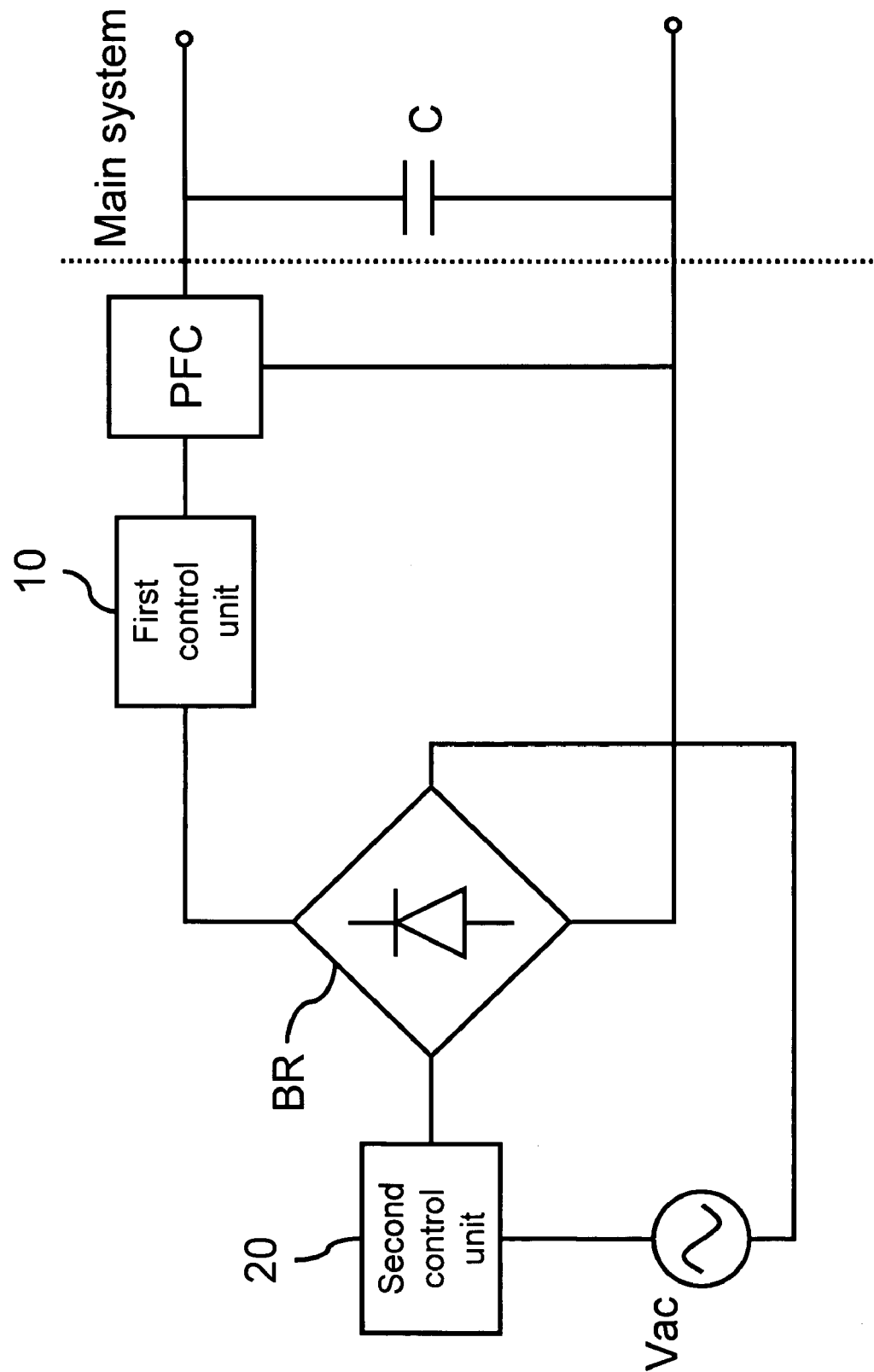
FIG. 7 illustrates an inrush current control circuit according to the fourth embodiment of the present invention.

The rectifying unit BR and the power factor correction circuit PFC are connected to form a main circuit of the inrush current control circuit, and the capacitor C in the main system is connected to the power factor correction circuit PFC in parallel. The first control unit 10 is connected between the rectifying unit BR and the power factor correction circuit PFC, and the second control unit 20 is connected in series with the first control unit 10 to have an impedance connection. That is, the first control unit 10 and the second control unit 20 are electrically connected in series in the main circuit of the inrush current control circuit. In the embodiment shown in FIG. 4, the first control unit 10 is connected to the positive pole of the rectifying unit BR in series, and the second control unit 20 is connected between the first control unit 10 and the power factor correction circuit PFC. Besides, the second control unit 20 may also be connected between the power factor correction circuit PFC and the negative pole of the rectifying unit BR (as shown in FIG. 5), or connected to a side of the alternative current Vac in series (as shown in FIGS. 6 and 7).

Because those configurations have similar functions, the circuit configuration in FIG. 4 is used as an example for illustration hereafter.

Figure 8:
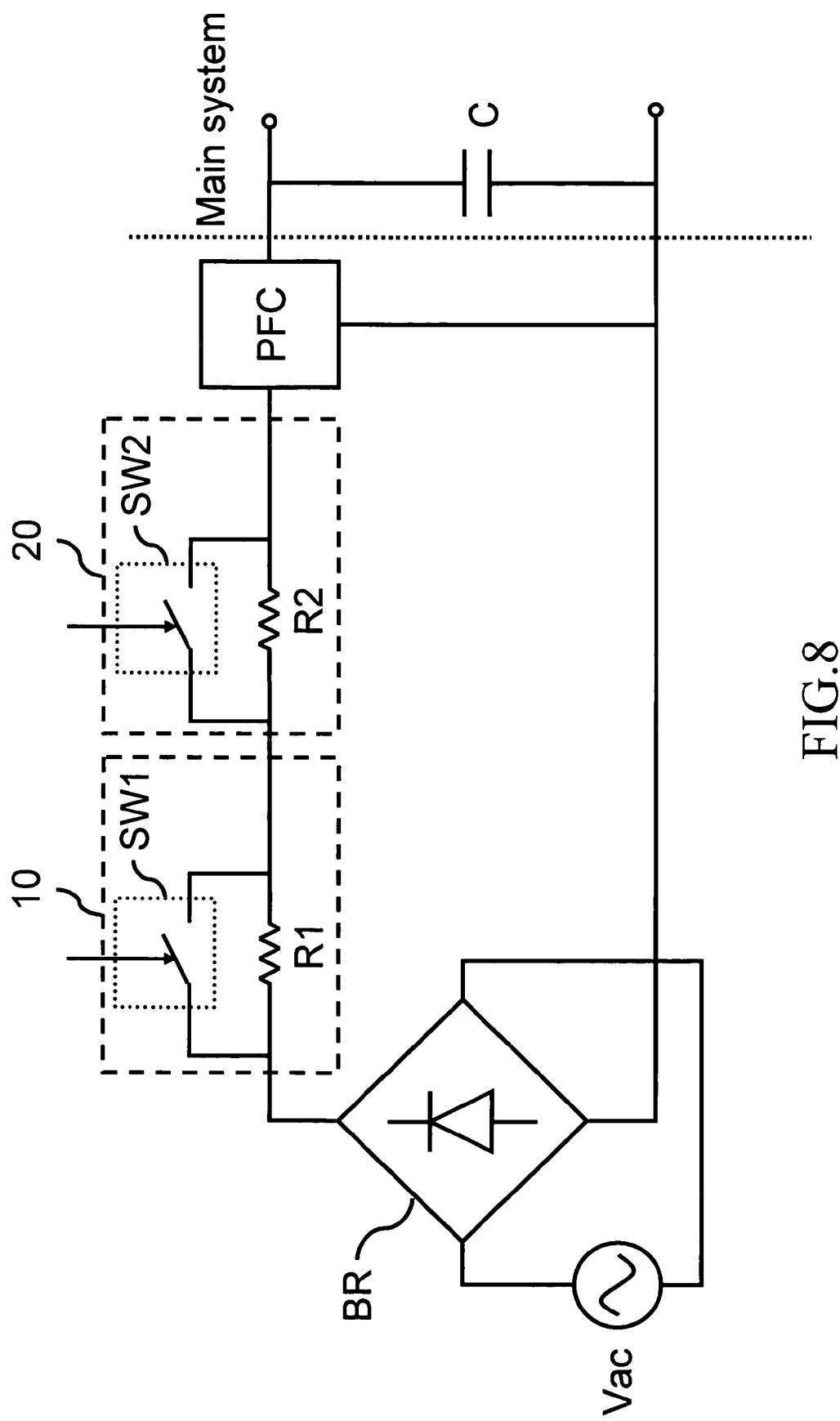
FIG. 8 illustrates an inrush current control circuit according to the fifth embodiment of the present invention.

Referring to FIG. 8, the first control unit 10 includes a first current limiting resistor R1 and a first switch SW1, and the second control unit 20 includes a second current limiting resistor R2 and a second switch SW2. The first switch SW1 and the second switch SW2 may be a relay, a diode, or a Metal-Oxide Semiconductor Field-Effect Transistor (MOSFET). The first and the second current limiting resistors may be a resistor or thermistor.

Herein, the first switch SW1 and the second switch SW2 are connected to the first current limiting resistor R1 and the second current limiting resistor R2 in parallel respectively, wherein the first switch SW1 turns on or off based on the DC voltage and the voltage of the capacitor C, and the second switch SW2 turns on or off based on the alternative current Vac.

When a power is detected (i.e., alternative current is supplied), the first switch SW1 and the second switch SW2 switch off, and the first current limiting resistor R1 and the second current limiting resistor R2 provide the current limiting function to limit a current applied to the capacitor C and the main system, so that the capacitor may begin to charge to prevent and the inrush current. When the power is supplied for a while and reaches stable, the first and the second switches SW1 and SW2 turn on, and thus the current will bypass the first and the second current limiting resistors R1 and R2, and the system will enter to a normal operation.

The second switch SW2 is controlled by the alternative current Vac. When the alternative current is at a low voltage level, the second switch SW2 turns off to avoid an inrush current generated when the alternative current is at a high voltage level in the next cycle. In other words, the second switch SW2 turns on or off based on the alternative current, that is, when the alternative current is supplied/cut off or shifts between a high voltage level and a low voltage level, the second switch SW2 turns on or off accordingly.

Figure 9:
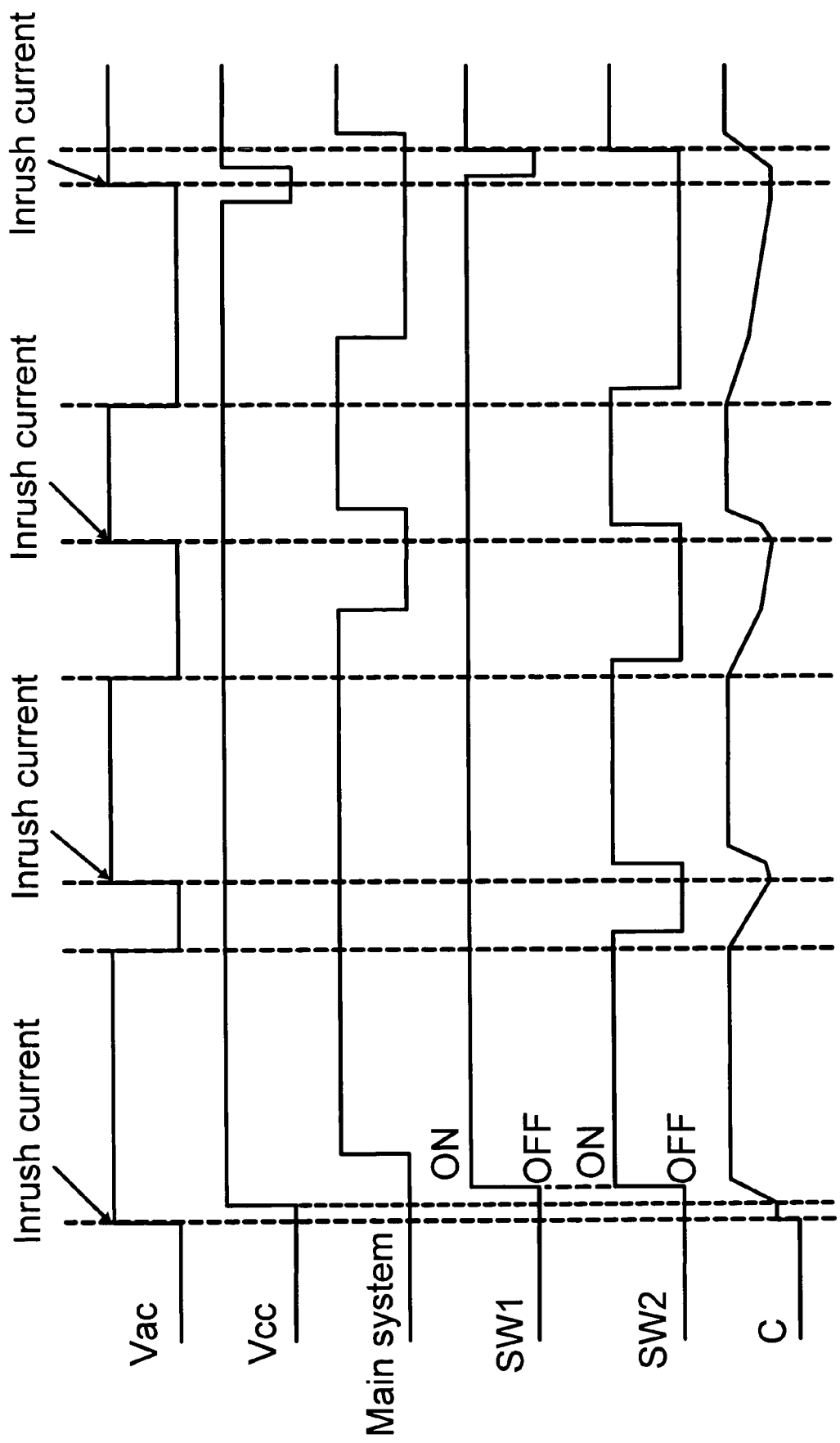
FIG. 9 is a timing diagram of an inrush current control circuit according to an embodiment of the present invention.

FIG. 9 is a timing diagram of an inrush current control circuit according to an embodiment of the present invention. As shown in the drawing, the top waveform Vac shows the timing of the alternative current, the second waveform Vcc shows the timing of the DC power of the first and the second switches, the third waveform shows the timing of the main system, the fourth and the fifth waveforms shows the timing of the first and the second switches, and the lowest waveform C shows the timing of the capacitor C. As shown in the drawing, when the alternative current Vac is supplied, the first switch SW1 is in the "off" state and the capacitor begins to charge. When the alternative current is stable, the first switch SW1 turns on, and thus the system enters to a normal operation condition. When the alternative current Vac is cut off, the first switch SW1 turns off accordingly. The second switch SW2 turns on when the alternative current Vac is supplied and reaches stable. Then, the second switch SW2 turns off with a specified time delay after the alternative current Vac shifts from a high voltage level to a low voltage level (or from a low voltage level to a high voltage level). The second switch SW2 turns off with a specified time delay after the alternative current is supplied. The specified time may be determined according to the design of the whole system.

Figure 10:
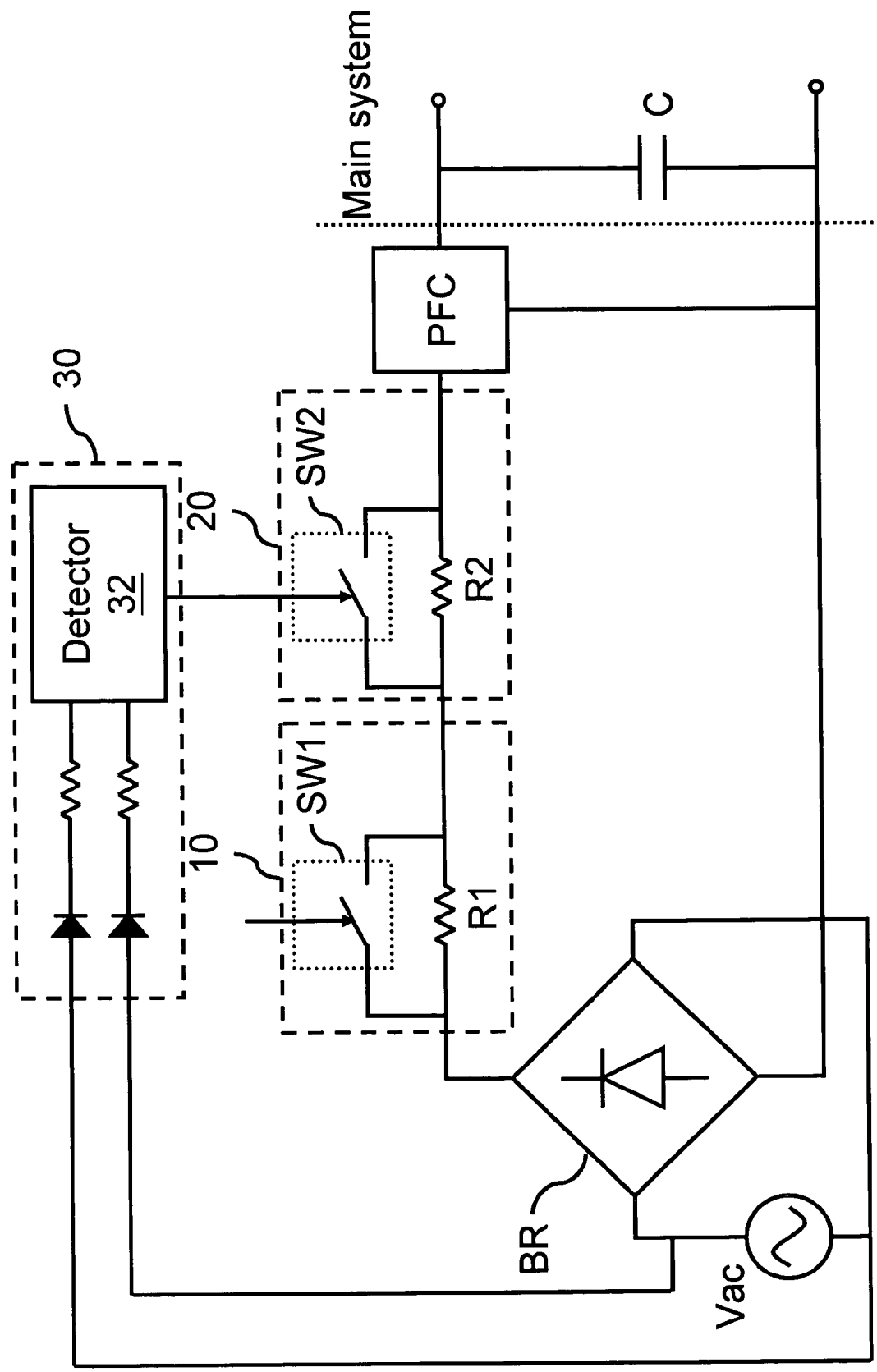
FIG. 10 illustrates an inrush current control circuit according to the sixth embodiment of the present invention.

The second switch SW2 may be controlled by a detecting circuit 30 for detecting alternative current as shown in FIG. 10. The detecting circuit 30 may include a detector 32, which is composed of a set of resistors and diodes connected in series, connected to the positive and negative poles of an alternative current to detect the variation of the alternative current, and switch on or off the second switch SW2 accordingly. While the present invention has been particularly shown and described with reference to exemplary embodiments thereof, it will be understood by those of ordinary skill in the art that many modifications and variations of the exemplary embodiments of the present invention are possible in light of the above teachings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inrush current control circuit, comprising:
a rectifying unit for rectifying an alternative current;
a power factor correction circuit connected between the positive pole and negative pole of the rectifying unit;
a capacitor connected between the power factor correction circuit and the negative pole of the rectifying unit;
a first control unit placed between the rectifying unit and the power factor correction circuit including:
  a first current limiting resistor for preventing a suddenly-generated inrush current; and
  a first switch connected to the first current limiting resistor in parallel, wherein the first switch turns on based on the voltage of the capacitor, and therefore, the alternative current bypasses the first current limiting resistor;
a second control unit connected with the first control unit in series including:
  a second current limiting resistor for preventing a suddenly-generated inrush current; and
  a second switch connected to the second current limiting resistor in parallel, wherein the second switch turns on based on the alternative current, and therefore, the alternative current bypasses the second current limiting resistor.

2. The inrush current control circuit of claim 1, wherein the second switch turns on or off with a specified time delay after the alternative current shifts between a high voltage level and a low voltage level.

3. The inrush current control circuit of claim 2, wherein the second switch turns on with a specified time delay after the alternative current is supplied.

4. The inrush current control circuit of claim 2, wherein the second switch turns off with a specified time delay after the alternative current shifts from a high voltage level to a low voltage level.

5. The inrush current control circuit of claim 2, wherein the second switch turns on with a specified time delay after the alternative current shifts from a low voltage level to a high voltage level.

6. The inrush current control circuit of claim 2, wherein the second switch turns off with a specified time delay after the alternative current is cut off.

7. The inrush current control circuit of claim 1, wherein the first switch turns on when the voltage of the capacitor is stable.

8. The inrush current control circuit of claim 1, wherein the first switch turns off when the alternative current is cut off.

9. The inrush current control circuit of claim 1, wherein the second control unit is placed between the first control unit and the power factor correction circuit.

10. The inrush current control circuit of claim 1, wherein the second control unit is placed between the power factor correction circuit and the negative pole of the rectifying unit.

11. The inrush current control circuit of claim 1, wherein the second control unit is placed at one side of the alternative current.

12. The inrush current control circuit of claim 1, wherein the second control unit is placed between the first control unit and the positive pole of the rectifying unit.

13. The inrush current control circuit of claim 1, further comprising: a detecting circuit for detecting alternative current connected between the input of the alternative current and the second control unit, wherein the second switch turns on or off based on the alternative current.

14. The inrush current control circuit of claim 1, wherein the first current limiting resistor is a resistor.

15. The inrush current control circuit of claim 14, wherein the resistor is a thermistor.

16. The inrush current control circuit of claim 1, wherein the second current limiting resistor is a resistor.

17. The inrush current control circuit of claim 16, wherein the resistor is a thermistor.

18. The inrush current control circuit of claim 1, wherein the first switch is selected from the group consisting of a relay, a diode, or a Metal-Oxide Semiconductor Field-Effect Transistor.

19. The inrush current control circuit of claim 1, wherein the second switch is selected from the group consisting of a relay, a diode, or a Metal-Oxide Semiconductor Field-Effect Transistor.

20. The inrush current control circuit of claim 1, wherein the suddenly-generated inrush current prevented by the first current limiting resistor is generated at the moment the alternative current is supplied.

21. The inrush current control circuit of claim 1, wherein the suddenly-generated inrush current prevented by the second current limiting resistor is generated at the moment the alternative current shifts between a high voltage level and a low voltage level.

* * * * *